Sept. 24, 1935.  C. L. LOOTENS  2,015,346
CONTINUOUS FILM PROCESSING METHOD AND APPARATUS
Original Filed Nov. 4, 1932   7 Sheets-Sheet 1

INVENTOR.
CHARLES L. LOOTENS.
BY
ATTORNEY.

Sept. 24, 1935.  C. L. LOOTENS  2,015,346
CONTINUOUS FILM PROCESSING METHOD AND APPARATUS
Original Filed Nov. 4, 1932   7 Sheets-Sheet 2

INVENTOR.
CHARLES L. LOOTENS
BY
ATTORNEY.

Sept. 24, 1935.     C. L. LOOTENS     2,015,346
CONTINUOUS FILM PROCESSING METHOD AND APPARATUS
Original Filed Nov. 4, 1932     7 Sheets-Sheet 3

INVENTOR.
CHARLES L. LOOTENS.
BY
ATTORNEY.

Sept. 24, 1935.  C. L. LOOTENS  2,015,346
CONTINUOUS FILM PROCESSING METHOD AND APPARATUS
Original Filed Nov. 4, 1932   7 Sheets-Sheet 4

INVENTOR.
CHARLES L. LOOTENS.
BY
ATTORNEY.

Sept. 24, 1935.　　　　C. L. LOOTENS　　　　2,015,346
CONTINUOUS FILM PROCESSING METHOD AND APPARATUS
Original Filed Nov. 4, 1932　　7 Sheets-Sheet 6

INVENTOR.
CHARLES L. LOOTENS.
BY Herbert A. Huebner
ATTORNEY.

Sept. 24, 1935. C. L. LOOTENS 2,015,346
CONTINUOUS FILM PROCESSING METHOD AND APPARATUS
Original Filed Nov. 4, 1932 7 Sheets-Sheet 7

INVENTOR.
CHARLES L. LOOTENS.
BY
ATTORNEY.

Patented Sept. 24, 1935

2,015,346

UNITED STATES PATENT OFFICE 2,015,346

CONTINUOUS FILM PROCESSING METHOD AND APPARATUS

Charles L. Lootens, Yonkers, N. Y., assignor to Cinema Patents Company, Inc., New York, N. Y., a corporation of New York Application November 4, 1932, Serial No. 641,247
Renewed June 3, 1935

25 Claims. (Cl. 95—94)

My invention relates to a continuous film processing method and apparatus in which motion picture film is printed with both picture and sound and developed, fixed, washed and dried, optionally waxed, finally projected for examination and wound up on reels ready for shipment, in a continuous process and without any interruption in the average delivery speed of the film.

Heretofore, in motion picture laboratory practice it has been customary to make the release print, which is the positive copy to be used for commercial projection, in the following manner: First, the picture is printed from the negative and the exposed positive wound upon a reel. This reel is then transferred to a second printer where the sound is printed upon a margin of the film, the picture area being masked out while the sound is being printed. As the positive passes through the sound printer, it is again wound up on a reel, and this reel is carried to the developing room and there run through an automatic developing machine in which the film is developed, fixed, washed and dried. At the delivery end of the drier the film is again wound up on a reel. Subsequently, the film is carried to a projection booth and threaded into a projector where an operator examines the picture during projection to detect any flaws or imperfections in the film.

Such practice, it will be noted, not only necessitates the services of a greater number of operators, but entails considerable loss of time in re-winding film and carrying it from one department to another. Moreover, in the present method of treating film, the human equation renders irregular results possible; as for instance, the printing lights in the printer, subject to manual control, might be improperly set through carelessness or mistake.

My invention overcomes the various objections above noted, speeds up production of release prints from previously prepared negatives and assures a uniformity of result never before obtained. Moreover, the possibility of damaging the film by human handling is minimized by the use of my method and apparatus, in which human hands touch the film only twice, first placing raw stock in the apparatus, and second, removing the finished product.

The system I employ is divided into the following units: (1) Supply magazines, (2) splicing stand, (3) loading elevator, (4) double headed automatic printer with continuous negative supply magazines, (5) printer control elevator, (6) developing machine, (7) projector control elevator, and (8) projector.

These units are arranged in line in the order named, and all but the projector may be in one room; it is desirable to have a partition between the preceding units and the projector so that white light reflected from the screen will not fog the undeveloped positive.

Figures 1, 1A, 2:
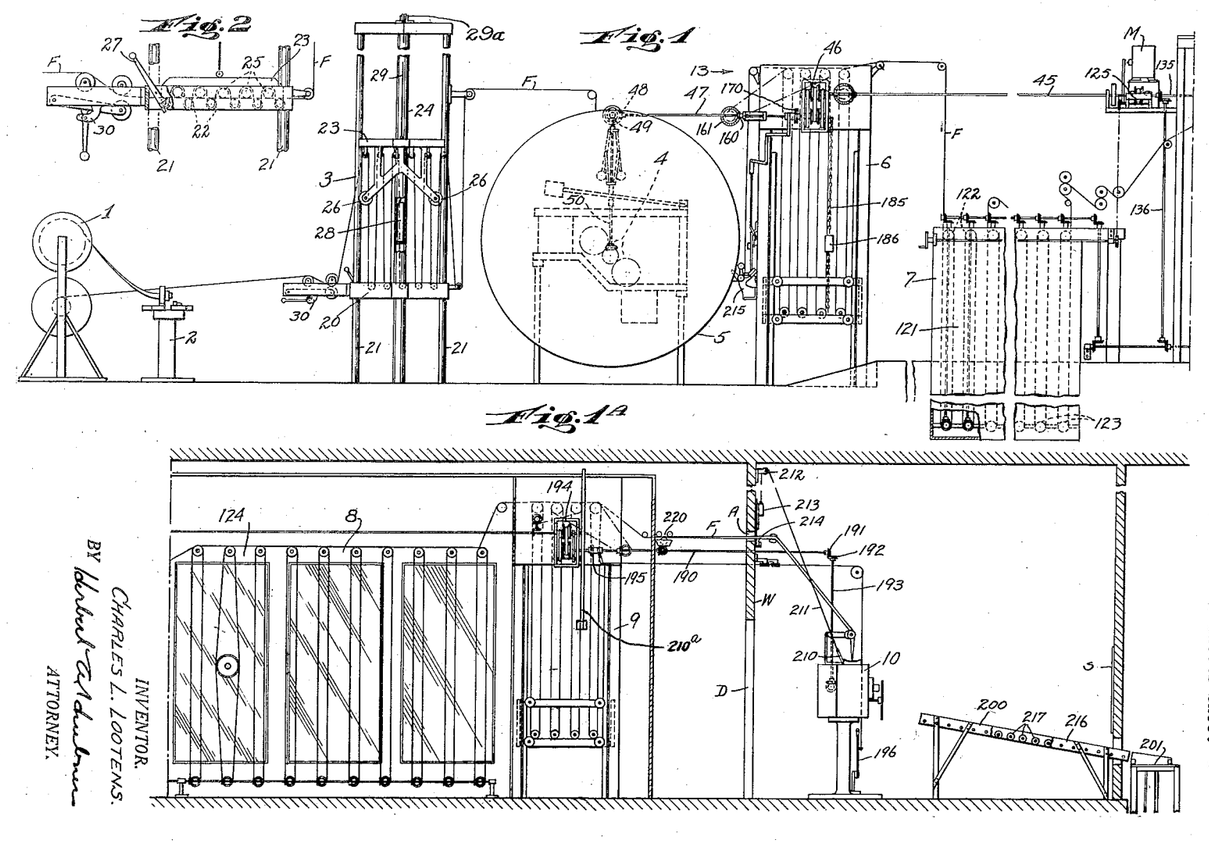
Figure 1 is a schematic layout of the system up to the drier of the developing apparatus, in which 1 is the supply magazine, 2 is the splicing stand, 3 is the storage elevator, 4 is the continuous printer, 5 represents the continuous negative supply magazines, 6 the printer control elevator and 7 the wet end of the developing apparatus.
Figure 1A is a schematic layout of the balance of the system, in which 8 is the drier, 9 is the projector control elevator and 10 is the projector.
Figure 2 is a fragmentary view of the storage elevator, showing the parts in different operating positions than in Figure 1.

Unexposed positive film known to the trade as "raw stock" is supplied from either one of the reels of magazine 1 and passes through the loading elevator 3 on its way to the printer.

The loading elevator is for the purpose of accumulating sufficient film for the operator to splice the tail end of one reel of raw stock to the free end of the next reel. The splicing is done on a conventional splicer 2.

Prior to the splicing operation, film F has been travelling through the loading elevator in a direct line without any accumulation therein (see Figure 2). The elevator is comprised essentially of the following: A fixed bracket 20 carried on tubular standards 21 supports a plurality of freely rotating spools 22, under which the film is trained. A movable bracket 23 is adapted to slide up and down by means of rollers 26 on tubular supports 21. Bracket 23 also carries freely rotating film spools 25 over which the film passes. The movable bracket 23 may be locked in its lowermost position as in Figure 2 by a locking device 27, and is normally maintained in that position. When, however, the end of a reel of film approaches, the operator releases the lock 27 and the movable bracket 23 travels upwardly under the impulse of a weight 28 adapted to slide up and down within the tubular member 24 and which tends to draw the bracket 23 upwardly through the medium of a cable 29 attached to the bracket and operating over a pulley 29a at the top of the elevator and desending into the tubular elevator 24, within which it is attached to the weight 28. On the lower end of weight 28 is attached a leather disc which fits snugly in tubular member 24. Tubular member 24 at its lower end is supplied with an air-tight cap in the side of the tube. A small hole permits air to escape when it is compressed when weight 28 is lowered by the elevation of movable bracket 23. The purpose of this air-tight compartment and small orifice is to permit the weight to descend at a predetermined rate of speed. The rate of speed depends upon the size of the orifice. This condition also prevents the carriage from rising at a terrific rate of speed in case the film breaks or jumps the rollers.

As the bracket 23 moves upwardly, film is drawn more rapidly than theretofore from the supply magazine and accumulates in the loading elevator. Meanwhile, the film continues to be fed from the elevator to the printer at substantially the same speed that it traveled theretofore. When a sufficient footage of film accumulates in the elevator, the operator clamps the film by means of the cam locking device indicated at 30, and while the operator is splicing the film, the movable bracket 23 in the elevator descends under the influence of film being drawn off of the elevator into the printer. The splice having been completed, the operator waits until the bracket 23 has descended to the position shown in Figure 2, at which time the bracket is locked in its lowermost position, and the operator simultaneously releases the film clamp 30. The operator may release the lock 30 before the bracket 23 has quite reached its lowermost position, and will then have to move the bracket the rest of the way down by pressure of the hand.

The double headed automatic printer will next be described. Two printing elements 40 and 41 for picture and sound, respectively, are located in proximity on a suitable frame. Film passes continuously through the printing elements by means of driven film sprockets 42, 43 and 44. These sprockets are rotated through shafts and gears, not shown, which derive their movement from a main power source such as an electric motor M (see Figure 1), operating through a Reeve's drive R, a main shaft 45, a second Reeve's drive 46, a second shaft 47, gears 48 and 49 and a vertical shaft 50. From the shaft 50, power is transmitted to sprockets 42, 43 and 44 by direct gear and shaft drive.

Figures 3, 4, 5, 5A:
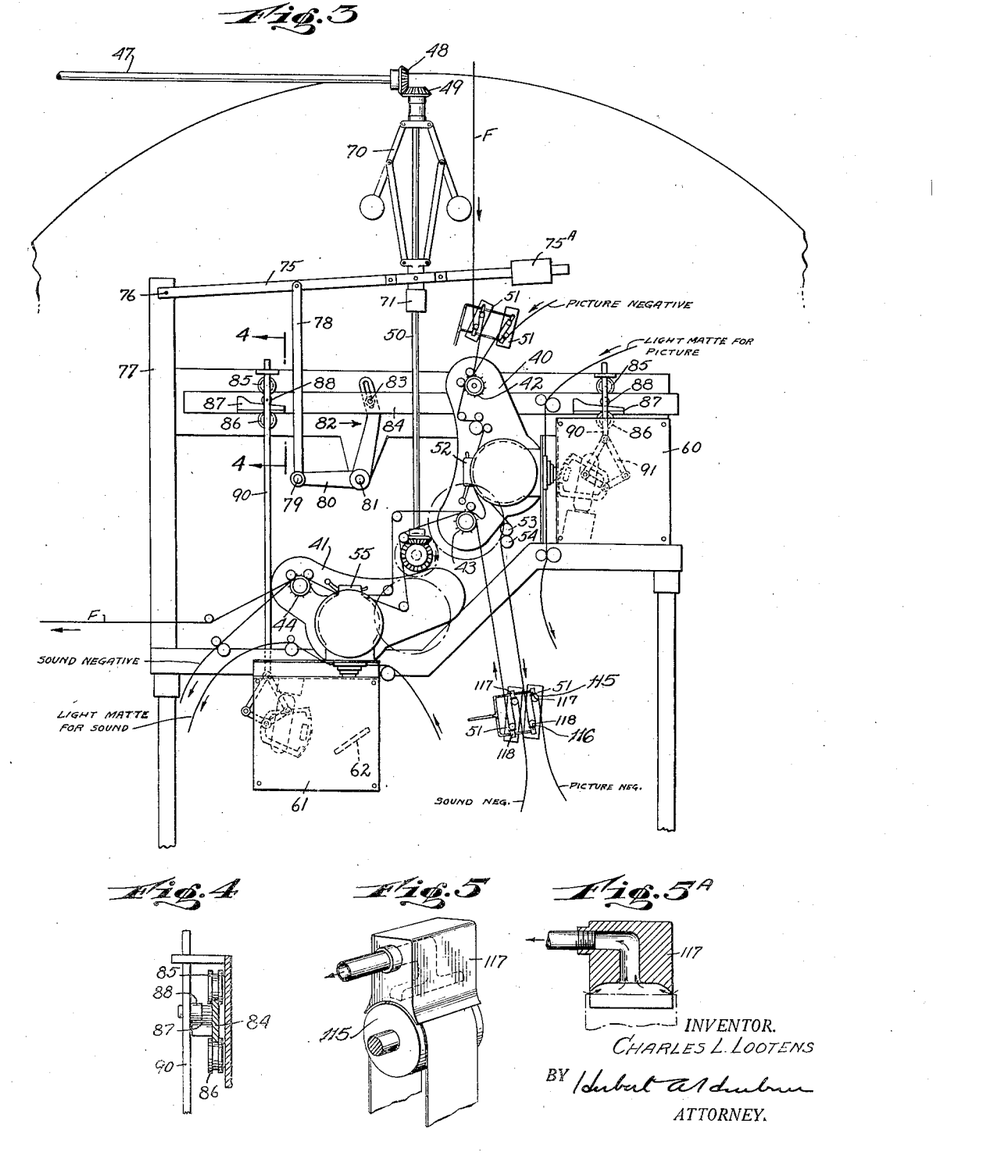
Figure 3 is an enlarged detail of the printer taken from the side opposite that showing in Figure 1.
Figure 4 is a fragmentary section of that part of the printer taken on the line 4—4 of Figure 3, which is an element of the light control gate assembly hereinafter described.
Figure 5 is a detail of a vacuum cleaner for film, which cleaner is a part of the printer.
Figure 5A is another detail, partly in section, of the same vacuum cleaner.

Picture negative, after travelling through a vacuum cleaner 51, comes in contact with the raw stock at sprocket 42 and travels with the raw stock past the printing gate 52 of the printing element 40, coming out over rollers 53 and 54, then passing through another vacuum cleaner before being wound up in the continuous negative magazine. Sound negative fed from the magazine, hereinafter described, comes in as indicated in Figure 3, contacting with the positive film at the sprocket 43 and passing with the positive film past the exposure gate 55 of the printing element 41, thence over the sprocket 44 and out to the magazine. The positive film, travelling in the direction of the arrow on the left side of Figure 3, then goes into the first (printer) control elevator.

The light box for the printing element 40 is indicated at 60, and the light box for the printing element 41 is indicated at 61. The two are similar, except that printing light in the light box 61 is reflected by means of a prism 62. Only one of the light boxes will be described in detail.

Figure 7:
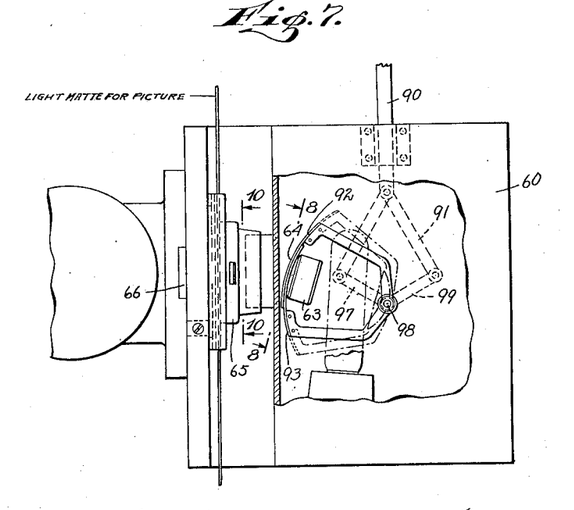
Figure 7 is an enlarged detail of one of the light control gates shown in Figure 3.
Figure 8:
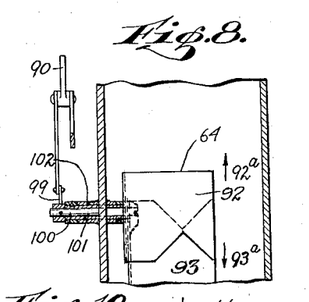
Figure 8 is a fragmentary front view of a shutter element taken on the line 8—8 of Figure 7.
Figure 9:
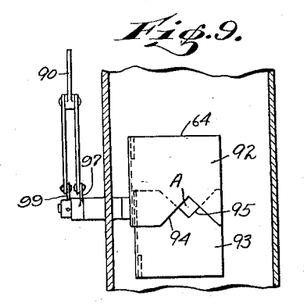
Figure 9 is a similar fragmentary view of the shutter element with the parts in a different operating position.

Referring to Figure 7, light collected by condenser lens 63 passes through a control shutter 64, then through a gate 65, through diffusing glass 66 toward printing gate 52. The purpose of shutter 64 is the automatic control of the printing light which reaches the film, in a manner responsive to the speed of the printer. This is necessary because when the printer slows down, the film is before the printing gate a longer time, and, therefore, requires less light; on the other hand, when the printer speeds up, the exposure is briefer, and, therefore, the light must be more intense or of greater volume. To accomplish this, the operating of the shutter (see Figures 8 and 9) is regulated by a governor 70 (see Figure 3). It will be noted, that as shown in Figure 8, the shutter is closed, passing no light, while in Figure 9, the shutter is partly open, passing some light. This change is accomplished in the following manner:

When the shaft 50 is rotating, the weights on the governor swing outwardly under centrifugal force, thereby elevating a collar 71 which freely encloses shaft 50. When the parts were in the positions shown in Figure 3, with the printer idle, the shutter was completely closed as in Figure 8; but, when the printer is started, and collar 71 travels upwardly, it swings bar 75, which is pivoted at 76 on a frame member 77, and in swinging upwardly elevates a link 78. On the end of bar 75 is attached a weight 75a. The function of this weight is to load the governor so that it will be more stable in its response and operation. Also by adjusting the position of the weight, the relation between speed and exposure may be changed. Pivoted at 79 is a crank 80 which is pivotally mounted at 81; and a slotted end of the crank moves in the direction of the arrow 82. This movement is transmitted through a pin 83 to a horizontal bar 84 adapted to reciprocate between two pairs of rollers 85 and 86.

On this horizontal bar 84 is a cam 87, the face of which engages a roller 88, and in travelling in the direction of the arrow 82 raises the roller.

This roller 88 is pivoted to a vertical member 90 of a linkage 91, which is drawn upwardly by the movement of the horizontal bar 84 in the direction of the arrow 82. This upward movement of the linkage 91 causes the rotation in opposite directions of two arcuate shields 92 and 93. Shield 92 rotates in the direction of the arrow 92a, and shield 93 rotates in the direction of the arrow 93a. The two shields have complementary V-shaped cut-away portions 94 and 95, the separation of which in more or less degree provides an aperture of greater or less area.

Shield 92 is rotated upwardly by means of a crank 97 pivoting at 98; and the shield 93 is rotated downwardly by a crank 99 having the same pivotal point 98. Thus it will be seen that as the speed of the shaft 50 varies, the position of the collar 71 changes, and through the various elements just described the aperture at A is enlarged or diminished.

The pivotal point 98 mentioned is figurative. As will be noted in Figures 8 and 9, the crank 99 is locked to a pin 100, which is secured to the shield 93 and transmits the rotative force of the crank 99. Crank 97 is keyed to a sleeve 101, which is keyed to the shield 92 and transmits to the shield 92 the rotative force of crank 97. The sleeve 101, which finds a bearing in a journal 102, in turn provides a bearing for the pin 100.

Due to lack of uniformity in the exposure of negatives, it is found in practice that different scenes in a single reel of negative will be of different densities; and as the release print should have an even density throughout, it is necessary to vary the volume or intensity of the light in the printer so that the release print, if developed under constant conditions, will have a uniform density and quality. The light change is effected in the old methods of film printing by having an operator manually re-adjust the printing light for printing each scene, sometimes as high as two hundred changes in a single reel.

In my system, I provide an automatic light change, which, having once been set, will function without the intervention of an operator to change the light according to a predetermined schedule.

Figure 6:
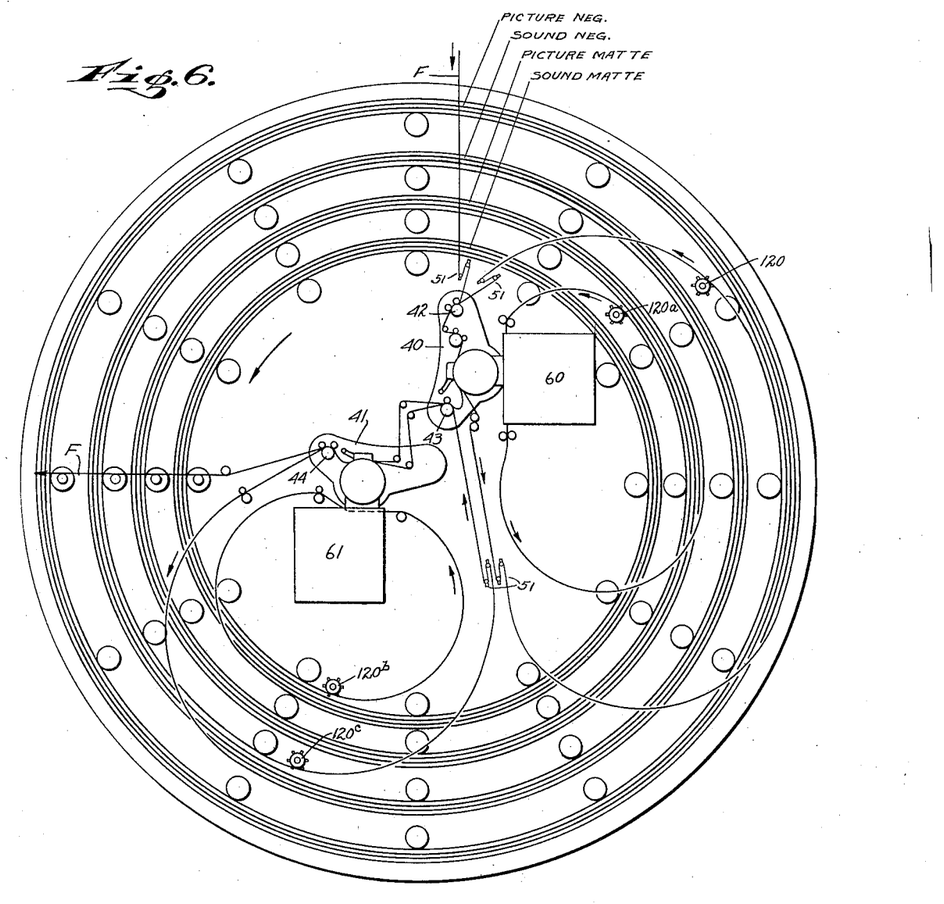
Figure 6 is an elevation of the continuous negative and light matte magazine assembly looking in the same direction as in Figure 3 and showing fragments of the printer to illustrate the relation of the printer and the magazines.

The light change element takes the form of a film matte having transparent center strips of different widths, depending upon the amount of light which it is desired to pass through. The matte is made by previously exposing a film behind different shields of the proper width, then developing the film until the sides are opaque, while the unexposed center remains transparent. The method of preparing this light matte is to be the subject of another application for patent. There is one light matte for the picture negative and another light matte for the sound negative. Each matte is in the form of a closed loop which, as shown in Figure 6, can be run through the printing device an indefinite number of times. In the interest of economy, I make the two light mattes relatively shorter than the picture negatives and sound negatives respectively, approximately in the ratio of one to four.

Referring to Figure 3, the course of the picture light matte through the printing element 40 may be readily traced. It is observed in greater detail in Figure 7, where it will be seen that the matte travels between the control shutter 64 and the film to be printed, passing adjacent to an aperture 110 shown in Figures 10 and 11. The horizontal dimension or length of the aperture is fixed and is the width of the film light matte. The vertical dimension or dimension parallel to the travel of the light matte is adjustable by means of the screw and cam mechanism 111 shown in Figure 10. The purpose of this adjustment is to provide a means of balancing the light of the picture printing aperture with the light of the sound track printing aperture. There is also a similar adjustable aperture on the sound track printing head element. This adjustment is also used to raise the general level of printing light for both picture and sound printing elements.

Figure 10:
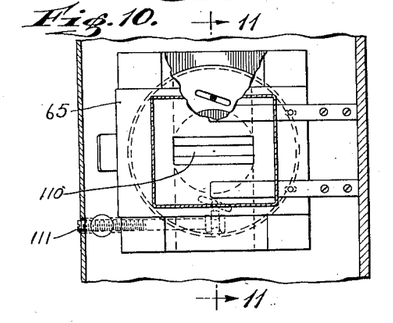
Figure 10 is a sectional view of a light aperture shield in the printer taken on the line 10—10 of Figure 7.
Figure 11:
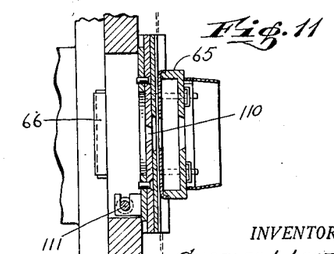
Figure 11 is a cross section of the same device taken on the line 11—11 of Figure 10.

In this connection I find it good practice to use a rheostat in series with the picture and sound printing lamps so that voltage impressed on the lamp can be changed. I have found that this is an ideal means for controlling the overall light intensity, and I control the light intensity so that the developing time required is that to produce optimum results insofar as contrast is concerned. Also when the voltage on the printing lamps is decreased, the color temperature of the filament is decreased so that printing is accomplished with a more yellow light. In actual practice this seems to increase the contrast of printing thereby in part compensating for the contrast lost in a continuous printer. After the proper width adjustments have been made to aperture 110, the printing light intensity is controlled by the various widths of light matte changes traveling through the control shutter 64. The light matte widths are selected in advance, and are joined together in lengths proportionate to the negative scenes. A marker on the sprocket which pulls the light matte through the control shutter 64 serves as a synchronizing medium which is matched with a mark on the light matte. In this way the light change is made at the same time the scene changes.

A similar device is employed in conjunction with the sound printing element 41.

As before noted, the picture negative is vacuum cleaned before and after the printing operation. The other films may be cleaned if it is found essential to do so.

Details of the cleaner appear in Figures 5 and 5A. The film describes an S around rollers 115 and 116, thus exposing both sides of the film to the action of vacuum devices 117 and 118, the mouths of which are formed arcuately to conform to the curvature of the rollers, and are maintained in proximity therewith.

In Figure 6, the continuous negative and light matte magazines are shown. Each one consists of a plurality of film supporting rollers arranged concentrically, the two light matte magazines being inside, due to their smaller capacity, and the picture and sound negative magazines, storing greater footage, being located outside. The two negatives and the two light mattes are each in the form of endless loops, so that they may be run through the printer repeatedly without stopping the apparatus to re-thread the film. The films are carried over the rollers of the respective magazines in a plurality of layers sufficient in number to store the films and properly confine them.

Arrows indicate the direction of travel of the four films, each being fed to the printing elements from inside the film layers by means of sprockets 120, 120a, 120b and 120c. After passing through the printing elements, the films are taken up on the outside layers.

It may sometimes be desirable to operate the system without the magazine 5. In such cases the negatives and light mattes are fed off of ordinary reels conveniently mounted on the printer, and after printing forward, and taken up on conventional rewinders, may be immediately threaded to unwind and print backwards. This method of operation does not cause any interruption in the delivery of finished pictures, because the printer automatically runs faster after being stopped, as hereinafter explained.

It will be necessary to next briefly discuss the developing machine, so that the nature of the control elevator may be better understood. The developing machine (see Figure 1) comprises a series of tanks 121 for containing developer, rinsing water, hypo and wash water in the order named, whereby the film is developed, rinsed, fixed and washed in successive continuous operations. In each tank, there is a series of upper film spools 122 mounted on shafts and a series of lower film spools 123 also mounted on shafts. The film is trained up and down over these upper and lower spools in a spiral path of travel, and thus is submerged in the various liquids during its passage through the wet end of the developing machine. The lower spools are power driven by the main motor drive M through shafts and gears as illustrated. From the wet end of the device, after having excess moisture removed by chamois-covered ringer rolls, of which air squeegees would be equivalent, the film travels to the drier 8 (see Figure 1A), in which the film passes up and down over upper and lower film spools through one or more cabinets 124, through which air previously conditioned as to temperature and humidity is circulated. The lower spools in the drier are driven as in the wet end of the developing machine. Upon leaving the drier, the film goes to the second control elevator and from there to the projector.

Figure 19:
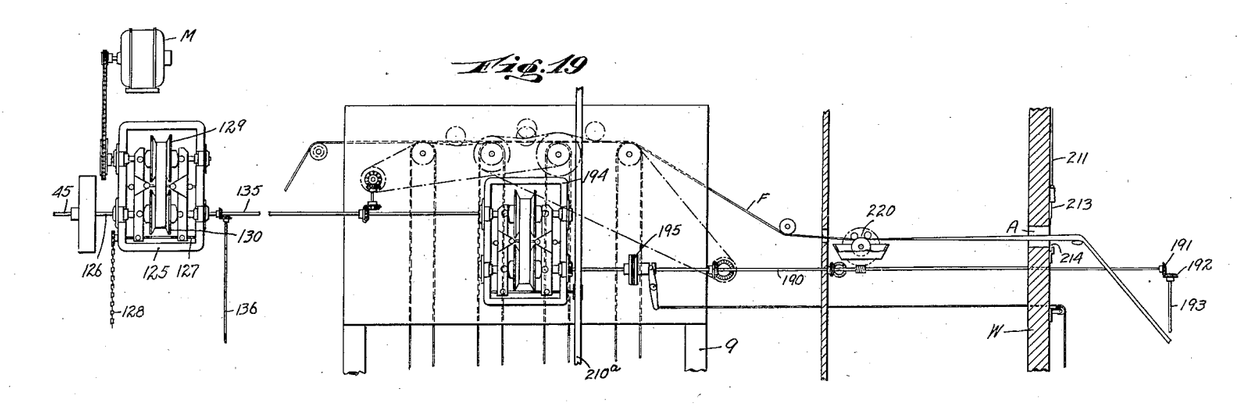
Figure 19 illustrates the general driving arrangement throughout the system.

Associated with the motor M is a speed change device 125, which may be of any conventional design, such as a Reeve's drive (see Figure 19).

From the power take off shaft 126 in the Reeve's drive, the power is distributed to all of the units of the system; and the average delivery speed of the complete apparatus is determined by the speed of the shaft 126. The speed of the shaft 126 may be manually adjusted by rotating a screw 127 by means of a chain 128, rotation of the screw 127 serving to change the relative diameters of the pulleys 129 and 130 in the Reeve's drive. It will be noted that shaft 45 extends from the Reeve's drive toward the raw-stock supply end of the apparatus, shaft 135 takes off in the opposite direction, and shaft 136 is the one which transmits power to the developing machine.

The developing machine is the one unit in the entire system which, when once set by the operator, according to the time of development required for the particular release going through the apparatus and any other factors which a skilled operator may consider, runs at a fixed speed until the speed adjustment is changed. Once having set the speed of the developing machine for a given release print, it should not be necessary to change the developing machine speed during the processing of that print regardless of the total footage involved, which may reach two million or more. If the developer be not kept up to original strength, it might be necessary to slow the developing machine somewhat.

Now, it becomes clear that with the developing machine operating at a constant speed, and without interruption, it is absolutely essential that positive film be supplied to the developing machine, and be drawn therefrom, at exactly the speed at which the film travels through the developing machine, quite regardless of any variations in the speed of the preceding units or of the succeeding units or the stopping of same.

To meet this need, I provide the control elevators heretofore mentioned and which will be described in detail. They are generally alike, but their positions are reversed as will become apparent.

The need for a control elevator of this type arises from the fact that an elevator of the temporary storage type shown at 3 in Figure 1 has not the capacity to store sufficient film necessary to meet the conditions which occur between the printer and the developing machine, and again between the drier of the developing machine and the projector. In an elevator of sufficiently large capacity it is not only necessary to mechanically advance the film to relieve strain, but it is also necessary to provide for a varying speed of the different film driving elements in the elevator.

Figure 12:
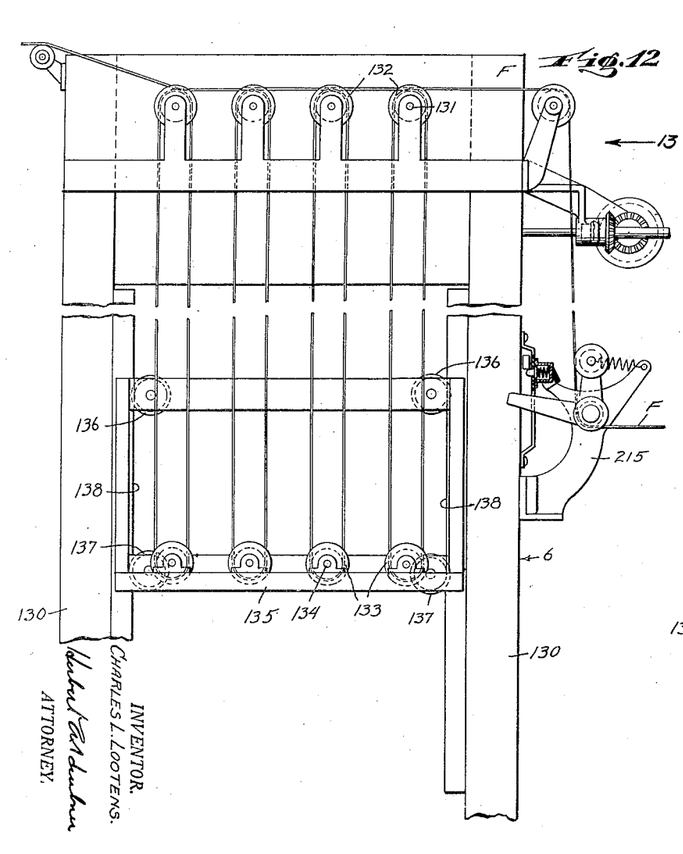
Figure 12 is a side elevation of the first control elevator numbered 6 in Figure 1 looking in the direction opposite to that of Figure 1.
Figure 13:
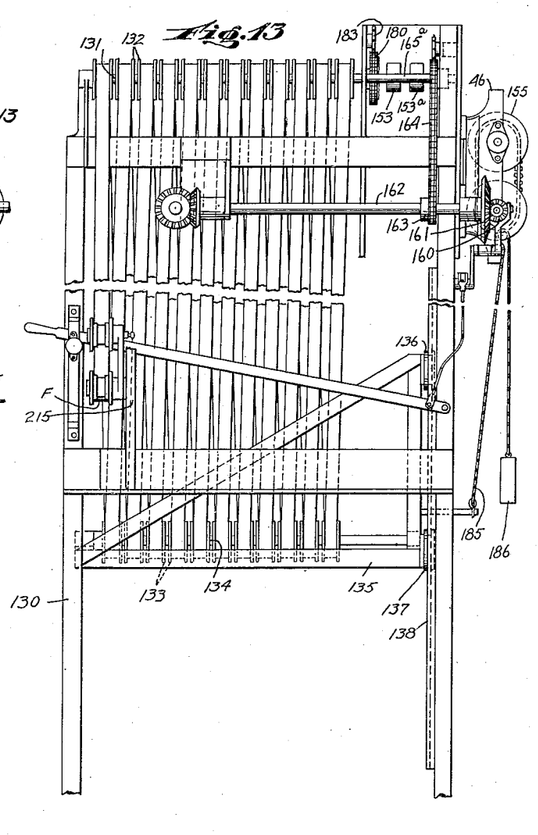
Figure 13 is a front elevation of the first control elevator looking in the direction of the arrows 13 in Figures 1 and 12.

Referring to Figures 12 and 13, the printer control elevator comprises a frame 130, which supports at its upper end a series of rotatable shafts 131 power driven as hereinafter described. The upper spools 132 are all rotated by contact with the shafts which support them, some of the spools being keyed to the shafts and others engaging with the shafts by relatively loose friction. A complementary series of lower spools 133 are mounted on shafts 134 and are free to rotate thereon, the lower shafts being idle. These lower shafts are mounted in a carriage 135, which is free to move up and down within the frame 130, being guided therein by roller bearings 136 and 137 which engage tracks 138 fixed to the frame. The film enters the elevator in the direction of the arrow 13 in Figure 12, passing over the first of the upper rollers 132 and descending down and around the first of the lower rollers 133, then traveling in a spiral path over the remaining rollers on the first pair of upper and lower shafts. After passing over the upper roller at the end of the shaft opposite the point where the film entered, the film is carried over in a horizontal direction to the next adjacent end roller, and resumes its spiral path of travel through the rest of the elevator.

It is clear that if film is supplied to the elevator more rapidly than it is drawn off of the elevator, each of the many loops of film will lengthen, and the carriage 135, being suspended by the film, will drop lower in the frame. On the other hand, should film be supplied to the elevator less rapidly than it is drawn off, or should the supply of film to the elevator cease, as may happen occasionally in operation, each one of the numerous loops of film will shorten, and while the accumulated film is being drawn off, the carriage 135 will rise in the frame.

Figure 14:
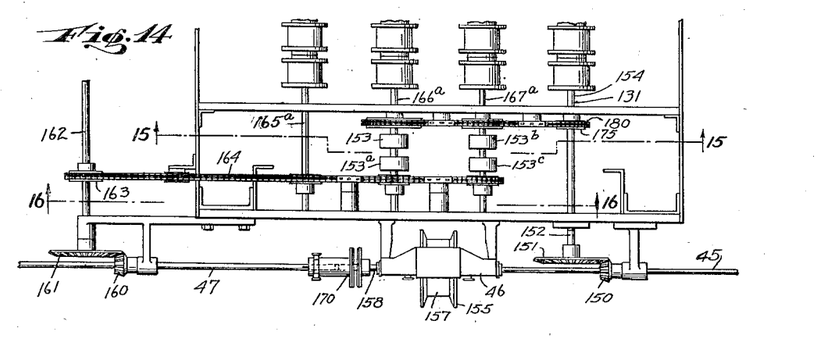
Figure 14 is a fragmentary top view of the first control elevator.
Figure 15:
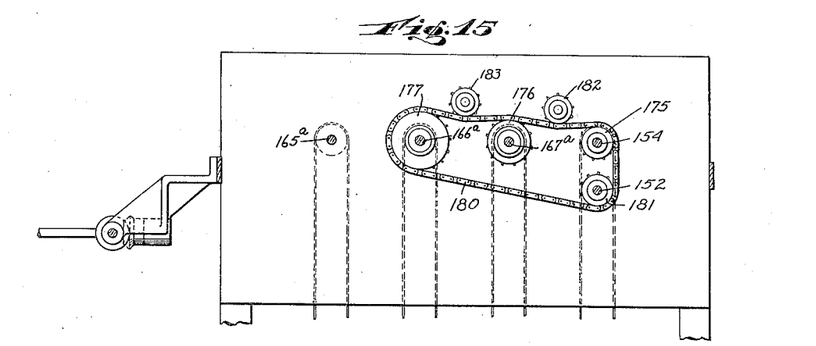
Figure 15 is a view taken on line 15—15 of Figure 14 showing a part of the elevator driving means.
Figure 16:
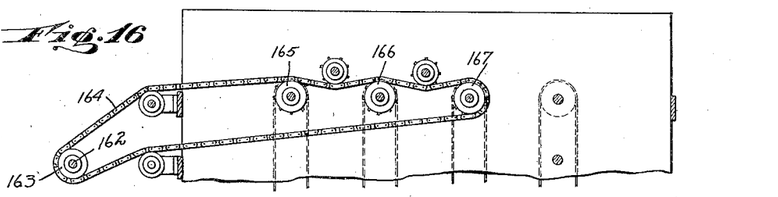
Figure 16 is a view taken on the line 16—16 of Figure 14 showing another part of the elevator driving means.
Figure 17:
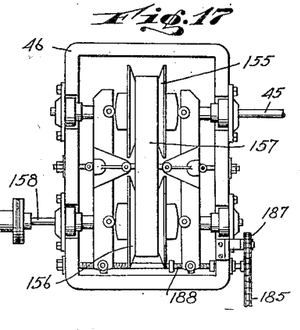
Figures 17 and 18 illustrate the conventional Reeve's drive as applied to my continuous processing system.
Figure 18:
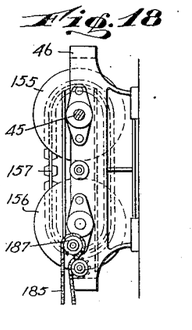

As it is desirable to maintain a fairly constant average accumulation of film in the elevator, the necessity becomes apparent for speeding up or slowing down certain of the driving devices in the elevator, depending upon whether it is desired to accumulate more film or less film therein. For instance, if the printer has been stopped for any reason, film which has accumulated in the elevator will continue to supply the developing machines without interruption. Obviously, however, the elevator carriage 135 will raise considerably during that period; and in order to provide against another emergency of that kind, it is necessary after the printer again begins operating to run it faster than the developing machine and to also run certain of the driving devices in the elevator faster than the developing machine until the proper amount of film has been accumulated in the elevator, and to thereupon diminish the driving speed of the preceding devices to normal. This is accomplished in the following manner:

Referring to Figures 14, 15 and 16, the drive shaft 152 which receives its power from gear 151 is connected to drive shaft 154 through sprocket 181 and drive chain 180. Sprocket 175 is rigidly attached to shaft 154. Sprocket 181 through the chain 180 drives sprocket 175 and consequently shaft 154 at the normal speed of the developing machine.

On shafts 166a, 167a there are attached in tandem two one-way clutches 153, 153a, 153b, and 153c, the internal mechanisms of which are arranged so that the shafts are driven at the speed of the faster clutch. The internal mechanism of each clutch consists of an expanding member within a shell. The expanding member will lock the shaft and the shell together when the shell is rotated faster than the internal mechanism. The drive sprockets 166, 167, 176 and 177 are mechanically attached to the shells of the respective clutches 163a, 153c, 153b and 153.

The chain 180 drives at all times sprockets 176 and 177. The pitch diameter of sprocket 176 is such that the speed of this sprocket is 75% of sprocket 175. The speed of sprocket 175, of course, is such that the film speed on the rollers on shaft 131 is the same as that in the developing machine. The pitch diameter of sprocket 177 is such that the speed of this sprocket is 50% of that of sprocket 175. Chain 164 drives sprockets 165, 166, and 167. When the printer clutch 170 is open, as when the printer is being re-threaded chain 164 is not traveling, so the shaft 167a rotates at 75% speed, shaft 166a rotates at 50% speed, and shaft 165a does not rotate. The film is pulled off the rollers on shaft 165a very slowly, by the driving force of the rollers on shaft 166a. The speed of take-off diminishes toward the end of the shaft where the film enters the elevator, at which point the film is entirely stationary.

When the printer clutch 170 is closed, and the printer is normally operating, the clutch shells connected with sprockets 166 and 167 are rotated faster than the clutch shells connected with sprockets 176 and 177 so that the shafts 166a and 167a are rotated through the clutches by chain 164.

While the printer was stopped, the carriage in the elevator has been slowly ascending. As the carriage goes up, a regulating chain 185 travels by the impulse of a weight 186 over a sprocket wheel 187 on the Reeve's drive, control screw 188 serves to spread the flanges of the lower pulley 156, thus decreasing the diameter thereof and at the same time drawing the flanges of the upper pulley 155 closer together and thus increasing the diameter thereof, the effect of which is to relatively speed up the shaft 158. Obviously, this increased speed of rotation will drive the printer at an increased rate of speed. Since the printer is then traveling at a higher rate of speed than the developing machine, the first three shafts 165a, 166a and 167a are rotated at a speed proportionate to the speed of the printer. This condition allows the film to be taken up from the printer at a greater speed than the film is taken off the elevator by the developing machine.

As the elevator carriage slowly drops in the frame due to accumulation of film, the control chain 185 moves downwardly with it, gradually reducing the speed of the printer and of the first three spool units in the elevator until that speed is again equal to the speed of the developing machine.

The projector control elevator is reversed in position so that the first spool assembly is driven at the same rate of speed as the elements in the drier, and the speed reduction and total stoppage occurs in connection with the projector 10.

Figure 20:
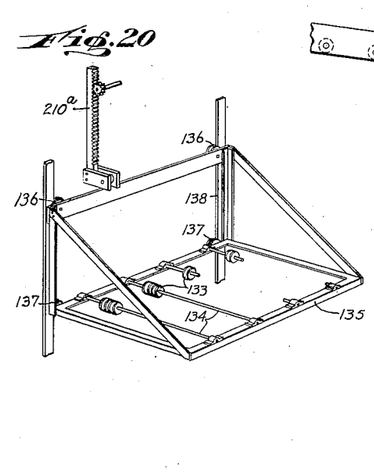
Figure 20 is a fragmentary perspective view of parts of the second (projector) control elevator, showing particularly the rack and gear speed control elements.

Moreover, the movable carriage 135 does not actuate the control mechanism on the Reeve's transmission until the carriage 135 has come to a position about 18 inches below the Reeve's transmission. At this point, the carriage comes in contact with a gear rack 210 (see Figure 1A) which in turn operates a control mechanism on the Reeve's transmission through a gear train shown in detail in Figure 20.

The reason for the difference in the elevators is that the normal position of the film carriage in the printing elevator is at the lower part of the elevator, and as the carriage rises, the Reeve's transmission is speeded up. In the projection elevator the normal position for the film carriage is within 18 inches of the Reeve's transmission. When the carriage is below this point the Reeve's transmission and projector and associated apparatus work at approximately 50% greater speed than the developing machine. During the last 18 inches of upward travel of the carriage, the gear rack begins to function, and the Reeve's transmission and associated apparatus is gradually slowed down until the carriage is within 6 inches of the Reeve's transmission, when the speed of the Reeve's transmission and associated apparatus becomes equal to that of the developing machine.

In other particulars the printer and projector control elevators are identical except that a film clamping device 215 is attached to the printing elevator as shown in Figure 12, and a waxing device 220 is attached to the projector elevator which is shown in Figure 19. The film clamping device is actuated by the control lever which operates the printer clutch. The waxing device on the projector elevator is driven in conjunction with the projector drive shaft. Liquid wax is supplied to the waxing chamber by means of a small reservoir. The level of wax in the waxing chamber is maintained at a proper height by means of a cork float which shuts off the wax when the proper level has been obtained, and allows wax to flow into the chamber when a lower level is reached.

The projector 10 comprises a standard head known to the art but in which the drive is effected through a shaft 190, gears 191 and 192 and a shaft 193. The shaft 190 takes its power from the Reeve's drive 194 in the projector control elevator. A clutch 195 operated at 196 in the projection booth performs the same function in this end of the system as the clutch 170 does at a point contiguous to the printer.

The finished film goes through an aperture in the wall W and descends to the projector 10, from which the picture is continuously projected upon screen S. Within the projector is a conventional wind-up reel, upon which the film is wound after projection. Reels of film in which no flaws or defects occur are placed in film cans and allowed to roll down delivery chute 200 on to an automatic stacking machine 201 in the shipping room.

It is necessary for the operator in the projection booth to stop the projector at the conclusion of a reel in order to remove the full reel and install an empty reel. Also, it is sometimes necessary for the operator to stop the projector and to examine film for scratches or other defects and to make a note of the same. It is during these periods when the projector is quiet that the control elevator 9 becomes essential. Film is fed continuously from the drier to the control elevator at the speed of the developing machine and accumulated in the elevator until the projector is again started, whereupon the projector and the last three spool assembly elements in the control elevator operate at a higher speed than those of the drier, until excess film which has accumulated in the control elevator is drawn off, whereupon the speed of operation of the projector and of units in the control elevator again becomes normal.

The projection booth, as noted, is isolated from the room containing the remainder of the apparatus. A doorway D is usually closed by a door not shown in the drawings. The aperture A where the film enters the projection booth is the one opening which offers an opportunity for the spread of fire in the event of any fire in the projection booth. An automatic device for closing this aperture A is provided in connection with the projector. A strip of inflammable material, such as film, 210 is attached to the top of the projector in a position where it would be severed by burning almost at the instant that a fire started in the projector. To this film is attached a cord 211 run over a pulley 212. At the end of the cord is a weighted door 213, which will slide into a socket 214 and effectively close the aperture A. The lower edge of this door 213 is sharpened, so that in descending to close the aperture it will sever the film.

The delivery chute 200 (see Figure 1A) consists of an inclined iron frame 216 supporting a series of rollers 217 over which the cans of film may travel by gravity.

The shipping room is separated from the projection room by a fire-proof partition.

Figure 21:
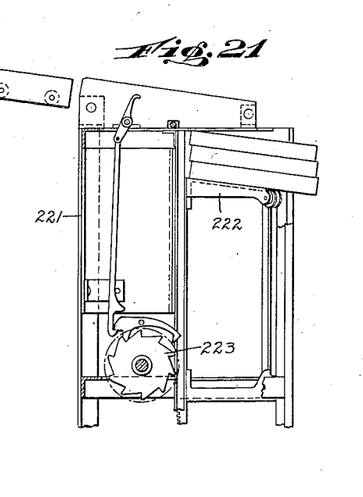
Figure 21 is a side view, partly in section, of my stacking device.
Figure 22:
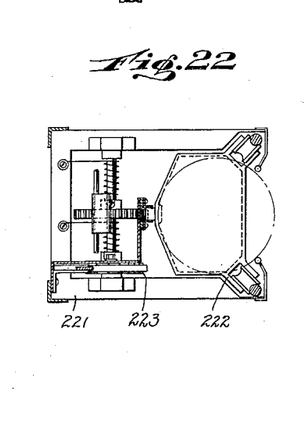
Figure 22 is a top view of the stacking device.

The automatic stacking machine 201, Figures 1A, 21, and 22 is provided so that the cans of film are automatically stacked, and serves as a temporary storage for the film cans. The stacking machine consists of a metal iron frame work 221 upon which is mounted a carriage 222 which moves in vertical position. As the film can passes through the opening in the wall, a ratchet wheel 223 is tripped by a lever, and the weight of the rack and the film allows the rack to take the next lower position, and allows the film can to come to rest on top of the preceding film cans. The shipping room clerk then passes a shipping box in front of these stacking machines, and collects one reel from each machine. When the shipping clerk has collected one reel from each machine, the collection is completed. The box is nailed up and labeled for shipment.

I claim:

1. A film treating apparatus comprising: a printer, a developing machine in operating conjunction therewith arranged to process film printed on the printer without intermediate rewinding of the film, the printer and developing machine having film advancing elements, and an elevator between the printer and the developing machine to temporarily store the film in transit from one to the other, having film advancing elements rotatively coupled with said film advancing elements in the printer or the developing machine.

2. A film treating apparatus comprising: a developing machine, a projector in operating conjunction therewith arranged to project film developed in the developing machine without intermediate rewinding of the film, the developing machine and projector having film advancing elements, and an elevator between the developing machine and the projector to temporarily store the film in transit from one to the other, having film advancing elements rotatively coupled with said film advancing elements in the developing machine or the projector.

3. A film treating apparatus comprising: a printer, a developing machine in operating conjunction therewith arranged to process film printed on the printer without intermediate rewinding of the film, and a speed control increasing or decreasing without manual intervention the operating speed of the printer to insure an uninterrupted supply of film to the developing machine notwithstanding occasional stopping of the printer.

4. A film treating apparatus comprising: a developing machine, a projector in operating conjunction therewith arranged to project film developed in the developing machine without intermediate rewinding of the film, and a speed control increasing or decreasing without manual intervention the operating speed of the projector so that it absorbs an average volume of film equal to the uninterrupted delivery volume of the developing machine notwithstanding occasional stopping of the projecor.

5. A film treating apparatus comprising: a printer, a developing machine, an elevator intermediate the printer and the developing machine for storing film in transit from one to the other, and a speed control coupled with the elevator responding to change in the amount of film in storage to speed up or slow down the printer.

6. A film treating apparatus comprising: a developing machine, a projector, an elevator intermediate the developing machine and the projector for storing film in transit from one to the other, and a speed control responding to change in the amount of film in storage to speed up or slow down the projector.

7. A film treating apparatus comprising the following units: a printer, a developing machine, and an elevator between the printer and the developing machine, arranged so that film may be printed, temporarily stored, and developed in successive operations during substantially continuous travel, driven rollers in each of the aforesaid units adapted to advance the film therethrough, said driven rollers being coupled to a common power source by which they are all driven at the same average speed to compensate for any variation in the speed of the printer or the elevator or the temporary stopping of the printer.

8. A film treating apparatus comprising the following units: a developing machine, a projector, and an elevator between the developing machine and the projector, arranged so that film may be developed, temporarily stored, and projected in successive operations during substantially continuous travel, driven rollers in each of the aforesaid units adapted to advance the film therethrough, said driven rollers being coupled to a common power source by which they are all driven at the same average speed to compensate for variation in the speed of the elevator or projector or the temporary stopping of the projector.

9. A film treating apparatus comprising the following units: a printer, a developing machine, an elevator between the printer and the developing machine, a projector, and an elevator between the developing machine and the projector, all arranged so that film may be printed, temporarily stored, developed, temporarily stored, and projected, in successive operations during substantially continuous travel, driven rollers in each of the aforesaid units adapted to advance the film therethrough, said driven rollers being coupled to a common power source by which they are all driven at the same average speed to compensate for variation in the speed of the printer or projector or elevators or the temporary stopping of the printer or projector.

10. A film treating apparatus comprising: a printer, a developing machine, film advancing means in said printer and developing machine, and an elevator between the printer and developing machine associating them so that a film may be delivered from the printer to the developing machine without intermediate rewinding of the film, said elevator including upper and lower rollers, means to drive certain of said rollers to advance film through the elevator, a speed control for changing the speed of the drive means governed by relative movement of the upper and lower rollers, said speed control being adapted to vary without manual intervention the relative speeds of the film advancing means in the printer and developing machine to maintain a common average rate of advance of film therethrough.

11. A film treating apparatus comprising a developing machine, a projector, film advancing means in said developing machine and projector, and an elevator between the developing machine and the projector, associating them so that a film may be delivered from the developing machine to the projector without intermediate rewinding of the film, said elevator comprising upper and lower rollers, means to drive certain of said rollers to advance film through the elevator, and a speed control for changing the speed of the drive means governed by relative movement of the upper and lower rollers, said speed control being adapted to vary without manual intervention the relative speeds of the film advancing means in the developing machine and projector to maintain a common average rate of advance of film therethrough.

12. A film treating apparatus comprising: a printer and a developing machine in operating conjunction, and an elevator therebetween adapted to maintain a reserve of film passing from the printer to the developing machine, the printer, developing machine and elevator including rollers driven to advance film therethrough, and a speed control for varying the speed of the rollers in the printer and in the elevator so that the average rate of speed of the rollers in the printer and in the elevator equals that of the rollers in the developing machine, said speed control being controlled by the amount of film in the elevator.

13. A film treating apparatus comprising: a series of film handling units, means in each of said units for advancing film therethrough, said means being adapted to be operated at different speeds, and a film reserve between adjacent treating units having a plurality of driven rollers, a plurality of idle rollers, and a transmission responding to differences in the operating speeds of the said units to vary the driving speeds of different driven rollers in the film reserve so that successive series of driven rollers are rotated at graduated driving speeds in conducting the film from one unit to another.

14. A film treating apparatus comprising: two film handling units, film advancing means in said units and a film reserve between said units, said reserve including rollers normally spaced apart over which film may travel, means to drive some of said rollers at the same speed, and said means including a transmission actuated by stoppage of certain of said driven rollers to stop the film advancing means in one of said units and to drive the remaining driven rollers in the film reserve at different speeds.

15. In a film treating machine, the combination with rollers to support a film strip, driving means to rotate certain of said rollers to advance the film, floating rollers adapted to ride in loops of the film, and a speed control actuated by vertical movement of the floating rollers to vary the speed of the driving means.

16. In a film treating machine, the combination with rollers to support a film strip, driving means to rotate certain of said rollers to advance the film, said means including a speed-change power conveyor, floating rollers adapted to ride in loops of the film, and a coupling operatively connecting the floating rollers and the speed-change power conveyor whereby vertical movement of the floating rollers will cause variation in the speed of the driving means.

17. In a film treating machine, the combination with upper rollers to support a film strip, lower rollers to guide the film strip, driving means to rotate certain of said rollers to advance the film strip, and a transmission, actuated upon the stoppage of driving means for certain rollers to simultaneously rotate the remaining driven rollers at progressively increasing speeds.

18. In a film treating machine, the combination with several series of rollers to support and advance a film strip in a plurality of loops, means to drive certain of said series of rollers, and a transmission actuated upon the stopping or slowing down of one of said driven series to vary the speed at which the other driven series are rotated.

19. In a film treating machine, the combination with a plurality of rollers to support and advance a film strip, of means to drive certain of said rollers, said means including two power conveying elements coupled with the driven rollers by one-way clutches so that the power conveying element which is operating faster will drive the driven rollers.

20. In a film treating machine, the combination with a film feeding mechanism, relatively fixed rollers, relatively movable rollers, a supporting frame for the movable rollers including a floating rack, a speed control actuated by vertical movement of the rack to speed up or slow down the said feeding mechanism.

21. In a film treating machine, the combination with a film feeding mechanism, relatively fixed film rollers, relatively movable rollers, a supporting frame for the movable rollers including a floating rack, a speed control actuated by vertical movement of the floating rack to speed up or slow down the said feeding mechanism, said speed control including a gear and gear rack, and a speed-change power conveyor controlled by the gear.

22. In a film treating machine, the combination with a plurality of driven shafts carrying film spools, means to drive all the shafts at the same speed, and a transmission actuated by the stoppage of one of said shafts to drive the others simultaneously at progressively slower speeds approaching the shaft which is stopped.

23. Apparatus for the continuous treatment of strip film comprising a printer where the image from a negative is printed upon a positive, a series of developing and treating receptacles wherein the latent image is developed, fixed, washed and dried, a projector by which the developed image is examined, and means to drive a single long strip of positive film continuously through said printer, treating receptacles, and projector at an average speed equal to the speed of the film through the developing receptacles, said means comprising a source of power and a speed-change power conveyor.

24. Apparatus for the continuous treatment of strip film comprising a printer where the image from a negative is printed upon a positive, a series of developing and treating receptacles wherein the latent image is developed, fixed, washed and dried, a projector by which the developed image is examined, temporary film storage units between the printer and the developing receptacle and between the last treating receptacle and the projector, and means to drive a single long strip of positive film continuously through said printer, storage unit, developing and treating receptacles, storage unit and projector, said means including driven film rollers in the said storage units.

25. Apparatus for the continuous treatment of strip film comprising: a plurality of film feeding rollers on shafts disposed so that a strip of film may pass serially through engagement with all of said rollers, a transmission coupled with a source of power for simultaneously operating certain of said shafts at progressively decreasing rates of speed to relieve strain on film when one of said shafts is stopped and to simultaneously increase the feeding speed of the other shafts when the one which has been stopped is started, said transmission being coupled with the shaft which has been stopped and responsive to the operating condition thereof.

CHARLES L. LOOTENS.